UNITED STATES PATENT OFFICE.

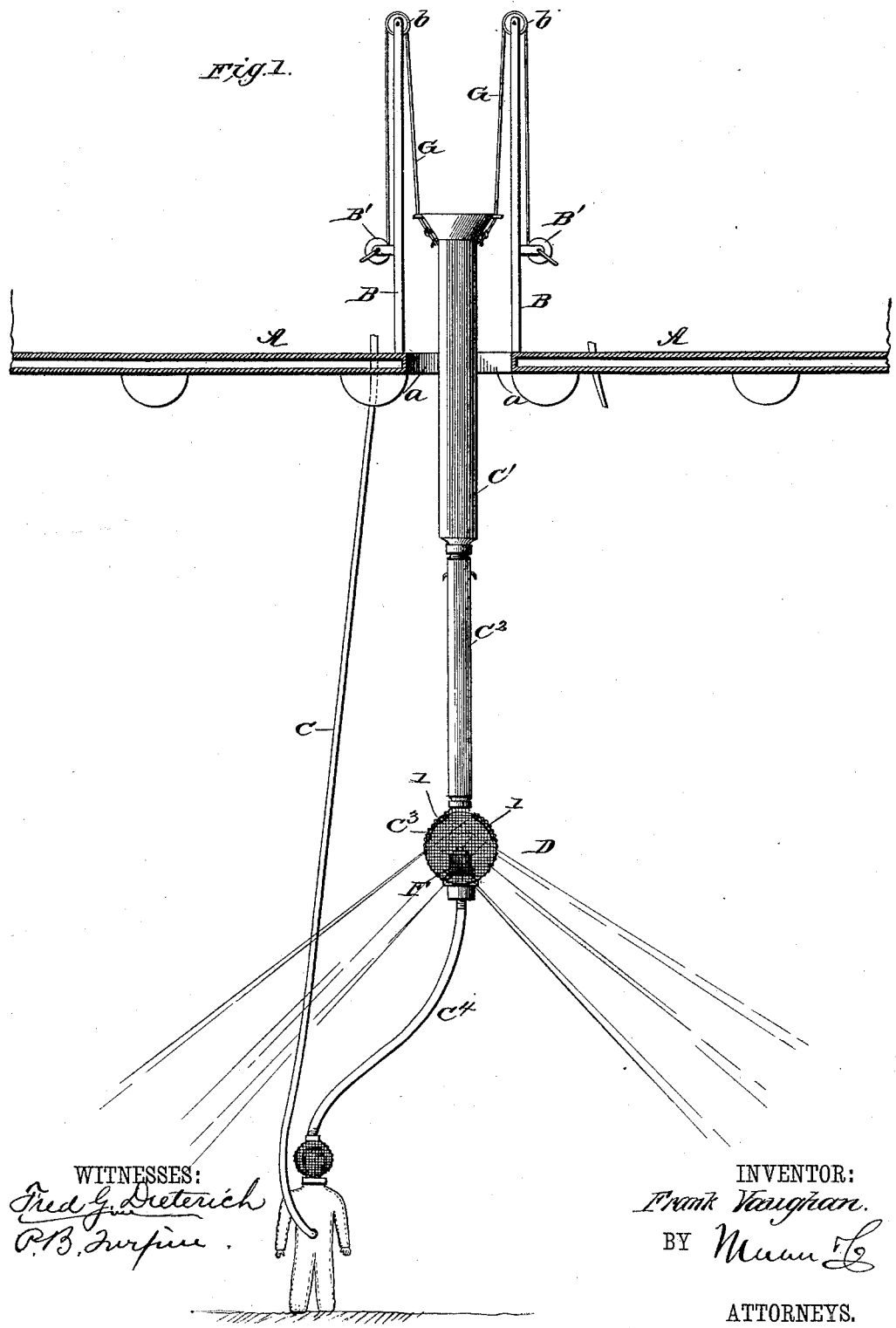

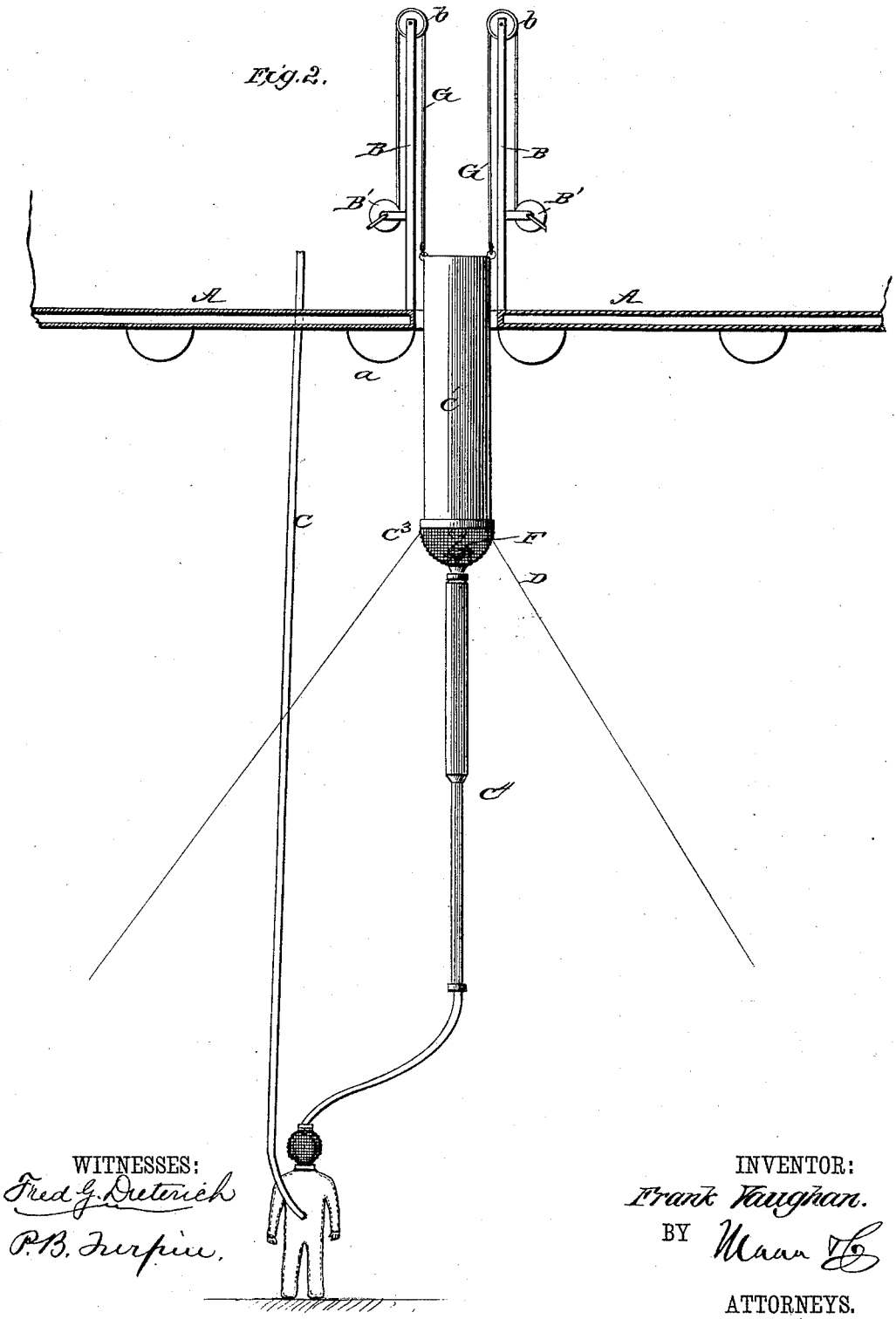

FRANK VAUGHAN, OF ELIZABETH CITY, NORTH CAROLINA.

SUBMARINE DIVING APPARATUS.

SPECIFICATION forming part of Letters Patent No. 413,000, dated October 15, 1889.

Application filed February 28, 1889. Serial No. 301,569. (No model.)

*To all whom it may concern:*

Be it known that I, FRANK VAUGHAN, of Elizabeth City, in the county of Pasquotank and State of North Carolina, have invented a new and useful Improvement in Submarine Diving Apparatus, of which the following is a specification.

My invention is an improvement in submarine diving apparatus, seeking especially to provide a simple novel construction for use in exploring the bottoms of rivers and comparatively shallow and still waters, and also in examining sunken vessels and the like.

The invention consists, broadly, in a submerged lamp arranged to automatically create and sustain the circulation and supply of fresh air to the diver.

The invention consists, further, in certain novel constructions and combinations of parts, as will be described, and pointed out in the claims.

In the drawings, Figure 1 shows my invention as in use, and Fig. 2 shows a modification in the construction of the lamp-chamber.

The float or support A may be in the form of a catamaran, as shown, or of other suitable shape or construction, as desired. At its center the float A has a well-like opening $a$, above which rises a suitable frame B for the guide-pulleys for the hoisting-ropes. An air-supply tube or tubes C lead from the float or support to the diver's armor, and a suitable tube D leads from the said armor upward. This armor of the diver may be of any approved form, and may be a complete casing for his entire body or only an inclosure for his head, the supply and discharge tubes being suitably applied or joined to properly supply the air to and receive it from the diver or other submarine worker. The supply-tube C is preferably made of rubber sufficiently thick and strong to prevent its being closed by bending or by the pressure of the water, and such tube may be made in any number of sections suitably coupled or joined, as will be readily understood. The discharge-tube leads upward through the well of the support, and is formed of an upper cylindrical section $C'$, a section $C^2$, coupled at its upper end to the lower end of section $C'$, a transparent lamp chamber or holder $C^3$, coupled to the lower end of section $C^2$, Fig. 1, and a pipe $C^4$, leading from holder or chamber $C^3$ to the armor or inclosure of the diver. The lamp F is suitably supported in the holder or chamber $C^3$, and when burning tends to rarefy the air in the discharge-tube, cause an upward draft therein, and thus produce and maintain the circulation of air desired. Now it will be understood that this lamp or equivalent heating device would effectually serve its purpose of producing and maintaining the circulation of air if supported in a non-transparent holder; but it is preferred to arrange it in a transparent holder, so its rays will illuminate the water and the bed of the stream or the object being examined or on which the diver may be working. To this end the holder is preferably a glass globe-like holder, as shown in Fig. 1; but manifestly it may be provided by furnishing the lower end of one of the cylindrical sections, usually the upper one, with a glass bottom and supporting the lamp immediately thereover, as will be understood from Fig. 2.

It will be understood from the foregoing that the lamp, when submerged, serves a double purpose, operating in the first instance as a draft or circulation producer and in the second place as an illuminator. It is therefore preferred to submerge the lamp, as shown.

In the glass holder shown in Fig. 1 I provide reflectors 1 1, arranged above the lamp and operating to direct the light downward toward the diver, as desired. This glass holder $C^3$ and the glass globe or head-piece forming the helmet of the diver's armor are usually incased in a wire netting.

It will be understood the sections of the discharge-tube may be multiplied or varied in length to enable the diver to go to different depths. To hoist the discharge-tube I provide ropes G, which connect at one end with the cylinder-section $C'$ by means of loops or rings engaging projections on said section, passing thence over the pulleys $b$ in frame B, and connected with the windlasses $B'$. Other suitable hoisting devices may be employed without departing from the broad principles of the invention.

It will be understood that the joints between the cylindrical sections may be made slightly flexible by the use of rubber.

As shown in the drawings, the lamp is arranged at a point above the diver or casing. By this construction the lamp operates to produce a positive upward draft in the length of outlet-tube below it, so the proper downward circulation in the air-supply pipe is secured, and so that there is no possibility of a reverse current—that is to say, one down the outlet-pipe and up through the supply-pipe—occurring at any time. The said arrangement of the lamp also enables the placing of same so it may properly illuminate the wreck or other object without any danger of dazzling the eyes of the diver.

Having thus described my invention, what I claim as new is—

1. In an apparatus substantially as described, the combination of the diver's armor, casing, or inclosure, the air-supply tube leading thereto, the air-discharge tube leading therefrom, a transparent lamp-holder supported between lengths of said air-discharge tube at a point above the armor, casing, or inclosure and below the surface of the water, and a lamp supported in said holder, whereby to serve the double purpose of an illuminator and a draft-producer, substantially as set forth.

2. In an apparatus substantially as described, the diver's armor, casing, or inclosure, and the tube supplying air thereto, combined with the air-discharge tube having a submerged transparent lamp-holder arranged at a point above the armor, casing, or inclosure, and a reflector or reflectors, whereby the light from the lamp in said holder may be cast downward, substantially as set forth.

3. In an apparatus substantially as described, the combination of the diver's armor, casing, or inclosure, the air-supply pipe leading thereto, the air-discharge tube leading therefrom and having at its upper end a cylinder-like section or sections, and provided at the lower end of the same with a glass globe-like lamp-holder, substantially as set forth.

4. An apparatus substantially as described, consisting of the diver's armor, casing, or inclosure, the air-supply pipe leading thereto, the air-discharge pipe, the transparent lamp-holder arranged above the casing, armor, or inclosure, the lamp arranged in said holder, and the reflectors arranged above said lamp.

5. In an apparatus substantially as described, the combination of the diver's armor, casing, or inclosure, the boat or support having a well-like opening, the air-supply pipe, the air-discharge pipe movable through the well-like opening, and hoisting devices, substantially as set forth.

FRANK VAUGHAN.

Witnesses:
F. F. COHOON,
J. P. OVERMAN.